United States Patent [19]

Chin et al.

[11] Patent Number: 5,037,538

[45] Date of Patent: * Aug. 6, 1991

[54] CATALYTIC CRACKING PROCESS WITH ISOLATED CATALYST FOR CONVERSION OF NOX IN FCC REGENERATOR

[75] Inventors: Arthur A. Chin; Jonathan E. Child, both of Cherry Hill, N.J.; Paul H. Schipper, Wilmington, Del.

[73] Assignee: Mobil Oil Corporation, Fairfax, Va.

[ * ] Notice: The portion of the term of this patent subsequent to Jan. 22, 2008 has been disclaimed.

[21] Appl. No.: 484,989

[22] Filed: Feb. 26, 1990

[51] Int. Cl.⁵ .................... C10G 11/00; C10G 35/00; B01J 20/34
[52] U.S. Cl. .................................. 208/113; 208/120; 208/149; 208/164; 502/41; 502/42; 423/239
[58] Field of Search ............... 208/113, 120, 164, 121, 208/149; 502/41, 42; 423/239

[56] References Cited

U.S. PATENT DOCUMENTS

| | | | |
|---|---|---|---|
| 4,609,537 | 9/1986 | Toplin et al. | 423/239 |
| 4,778,665 | 10/1988 | Krishnamurthy et al. | 268/120 |
| 4,812,430 | 3/1989 | Child | 502/42 |
| 4,812,431 | 3/1989 | Child | 502/42 |

*Primary Examiner*—Anthony McFarlane
*Assistant Examiner*—Nhat Phan
*Attorney, Agent, or Firm*—Alexander J. McKillop; Charles J. Speciale; Richard D. Stone

[57] ABSTRACT

Oxides of nitrogen ($NO_x$) emissions from an FCC regenerator are reduced by adding a $DeNO_x$ catalyst to the FCC regenerator in a form whereby the $DeNO_x$ catalyst remains segregated within the FCC regenerator. This permits use of a $DeNO_x$ catalyst without regard to the effect of the $DeNO_x$ catalyst on the catalytic cracking reaction. Floating hollow spheres, or catalyst fines, containing the $DeNO_x$ catalyst are preferred.

15 Claims, No Drawings

CATALYTIC CRACKING PROCESS WITH ISOLATED CATALYST FOR CONVERSION OF NOX IN FCC REGENERATOR

BACKGROUND OF THE INVENTION

1. Field of the Invention

The invention relates to catalytic reduction of oxides of nitrogen, $NO_x$, produced in the regenerators associated with catalytic cracking unit regenerators.

2. Description of Related Art

The presence of $NO_x$, or oxides of nitrogen, in flue gas streams, is a pervasive problem. Several powerful ways have been developed to deal with the problem. The approaches fall into roughly three categories: process approaches which inherently reduce the amount of $NO_x$ formed in a regenerator, catalytic approaches using a catalyst or additive which is compatible with the FCC reactor, and stack gas cleanup methods which are isolated from the FCC process. The FCC process will be briefly reviewed, followed by a review of the state of the art in reducing $NO_x$ emissions.

FCC PROCESS

Catalytic cracking of hydrocarbons is carried out in the absence of externally supplied H2, in contrast to hydrocracking, in which H2 is added during the cracking step. An inventory of particulate catalyst is continuously cycled between a cracking reactor and a catalyst regenerator. In the fluidized catalytic cracking (FCC) process, hydrocarbon feed contacts catalyst in a reactor at 425° C.–600° C., usually 460° C.–560° C. The hydrocarbons crack, and deposit carbonaceous hydrocarbons or coke on the catalyst. The cracked products are separated from the coked catalyst. The coked catalyst is stripped of volatiles, usually with steam, and is then regenerated. In the catalyst regenerator, the coke is burned from the catalyst with oxygen-containing gas, usually air. Coke burns off, restoring catalyst activity and simultaneously heating the catalyst to, e.g., 500° C.–900° C., usually 600° C.–750° C. Flue gas formed by burning coke in the regenerator may be treated for removal of particulates and for conversion of carbon monoxide, after which the flue gas is normally discharged into the atmosphere.

Most FCC units now use zeolite-containing catalyst having high activity and selectivity. These catalysts work best when the amount of coke on the catalyst after regeneration is relatively low. It is desirable to regenerate zeolite catalysts to as low a residual carbon level as is possible. It is also desirable to burn CO completely within the catalyst regenerator system to conserve heat and to minimize air pollution. Heat conservation is especially important when the concentration of coke on the spent catalyst is relatively low as a result of high catalyst selectivity. Among the ways suggested to decrease the amount of carbon on regenerated catalyst and to burn CO in the regenerator is to add a CO combustion promoter metal to the catalyst or to the regenerator. Metals have been added as an integral component of the cracking catalyst and as a component of a discrete particulate additive, in which the active metal is associated with a support other than the catalyst. U.S. Pat. No. 2,647,860 proposed adding 0.1 to 1 weight percent chromic oxide to a cracking catalyst to promote combustion of CO. U.S. Pat. No. 3,808,121, incorporated herein by reference, introduced relatively large-sized particles containing CO combustion-promoting metal into a cracking catalyst regenerator. The circulating particulate solids inventory, of small-sized catalyst particles, cycled between the cracking reactor and the catalyst regenerator, while the combustion-promoting particles remain in the regenerator. Oxidation-promoting metals such as cobalt, copper, nickel, manganese, copper-chromite, etc., impregnated on an inorganic oxide such as alumina, are disclosed.

U.S. Pat. Nos. 4,072,600 and 4,093,535 teach use of combustion-promoting metals such as Pt, Pd, Ir, Rh, Os, Ru and Re in cracking catalysts in concentrations of 0.01 to 50 ppm, based on total catalyst inventory. This approach is so successful that most FCC units use CO combustion promoters. This reduces CO emissions, but usually increases nitrogen oxides ($NO_x$) in the regenerator flue gas. It is difficult in a catalyst regenerator to completely burn coke and CO in the regenerator without increasing the $NO_x$ content of the regenerator flue gas.

PROCESS APPROACHES TO $NO_x$ CONTROL

Process modifications are suggested in U.S. Pat. No. 4,413,573 and U.S. Pat. No. 4,325,833 directed to two- and three-stage FCC regenerators, which reduce $NO_x$ emissions.

U.S. Pat. No. 4,313,848 teaches countercurrent regeneration of spent FCC catalyst, without backmixing, to minimize $NO_x$ emissions.

U.S. Pat. No. 4,309,309 teaches the addition of a vaporizable fuel to the upper portion of a FCC regenerator to minimize $NO_x$ emissions. Oxides of nitrogen formed in the lower portion of the regenerator are reduced in the reducing atmosphere generated by burning fuel in the upper portion of the regenerator.

The approach taken in U.S. Pat. No. 4,542,114 is to minimize the volume of flue gas by using oxygen rather than air in the FCC regenerator, with consequent reduction in the amount of flue gas produced.

In Green et al, U.S. Pat. No. 4,828,680, which is incorporated herein by reference, the level of $NO_x$ emissions from a FCC unit was reduced by incorporating carbonaceous particles such as sponge coke or coal into the circulating inventory of cracking catalyst. The carbonaceous particle performed several functions, selectively absorbing metal contaminants in the feed and also reducing $NO_x$ emissions in certain instances.

This approach is well suited to FCC units, where large volumes of coal or coke-containing particles can be easily handled. However, some modification of the FCC unit may be necessary, and the reduction in $NO_x$ emissions may not be as great as desired.

Another process approach is to create a relatively reducing atmosphere in some portion of the regenerator by segregating the CO combustion promoter. Reduction of $NO_x$ emissions in FCC regenerators was achieved in U.S. Pat. Nos. 4,812,430 and 4,812,431 by using a conventional CO combustion promoter (Pt) on an unconventional support which permitted the support to segregate in the regenerator. Use of large, hollow, floating spheres gave a sharp segregation of CO combustion promoter in the regenerator. Disposing the CO combustion promoter on fines, and allowing these fines to segregate near the top of a dense bed, or to be selectively recycled into the dilute phase above a dense bed, was another way to segregate the CO combustion promoter.

CATALYTIC APPROACHES TO NO$_x$ CONTROL

Recent catalyst patents include U.S. Pat. No. 4,300,997 and its division U.S. Pat. No. 4,350,615, both directed to the use of Pd-Ru CO-combustion promoter. The bi-metallic CO combustion promoter is reported to do an adequate job of converting CO to CO2, while minimizing the formation of NO$_x$.

Another catalyst development is disclosed in U.S. Pat. No. 4,199,435 which suggests steam treating conventional metallic CO combustion promoter to decrease NO$_x$ formation without impairing too much the CO combustion activity of the promoter.

U.S. Pat. No. 4,235,704 suggests too much CO combustion promoter causes NO$_x$ formation, and calls for monitoring the NO$_x$ content of the flue gases, and adjusting the concentration of CO combustion promoter in the regenerator based on the amount of NO$_x$ in the flue gas. As an alternative to adding less CO combustion promoter the patentee suggests deactivating it in place, by adding something to deactivate the Pt, such as lead, antimony, arsenic, tin or bismuth.

All the catalyst and process patents discussed above in the sections devoted to process and catalytic routes to reduce NO$_x$ emissions are incorporated herein by reference.

STACK GAS TREATMENT

It is also known to react NO$_x$ in flue gas with NH3. NH3 is a very selective reducing agent, which does not react rapidly with the excess oxygen which may be present in the flue gas.

Two types of NH$_3$ process have evolved, thermal and catalytic.

Thermal processes, such as the Exxon Thermal DeNO$_x$ process, generally operate as homogeneous gas-phase processes at very high temperatures, typically around 1550°-900° F. More details of such a process are disclosed by Lyon, R. K., Int. J. Chem. Kinet., 3, 315, 1976, which is incorporated herein by reference.

The catalytic systems which have been developed operate at much lower temperatures, typically at 300°-850°F. These temperatures are typical of flue gas streams. Unfortunately, the catalysts used in these processes are readily fouled, or the process lines plugged, by catalyst fines which are an integral part of FCC regenerator flue gas. U.S. Pat. No. 4,521,389 and U.S. Pat. No. 4,434,147 disclose adding NH3 to NO$_x$-containing flue gas to catalytically reduce the NO$_x$ to nitrogen.

None of the approaches described above provides the perfect solution. Process approaches, such as multistage or countercurrent regenerators, reduce NO$_x$ emissions but require extensive rebuilding of the FCC regenerator.

Various catalytic approaches, e.g., addition of lead or antimony, as taught in U.S. Pat. No. 4,235,704, to degrade the efficiency of the Pt function may help some but still may fail to meet the ever more stringent NO$_x$ emissions limits set by local governing bodies. It is also important, in many FCC units, to maintain the effectiveness of the CO combustion promoter, in order to meet CO emissions limits.

Stack gas cleanup methods are powerful, but the capital and operating costs are high.

It would be beneficial if a catalytic approach were available to reduce NO$_x$ emissions without degrading the effectiveness of Pt as a CO combustion promoter.

We wanted to reduce NO$_x$ emissions from FCC regenerators by using a catalytic approach. This would allow us to work with existing equipment, and avoid the capital costs of extensive unit modifications. We felt that the key was selection of a catalyst which was active for DeNO$_x$, but which would not have any adverse effects in the FCC reactor. At first this seemed an almost insurmountable barrier, because the most active catalysts must rigorously be kept out of cracking reactors. For example, most hydrogenation/dehydrogenation catalysts, including metals such as Ni and V, and quite a few others, are powerful catalysts for nitrogen removal in a hydrogen rich atmosphere. However, these metals are poisons in catalytic cracking units, i.e., they cause undesirable reactions which increase the production of coke and dry gas.

We discovered that NO$_x$ emissions from FCC regenerators could be greatly reduced by adding a catalyst which would promote catalytic reduction of NO$_x$, in a form which allowed the catalyst to be relatively isolated from the FCC unit. In this way a powerful DeNO$_x$ catalyst could be used, without regard to possible adverse effects in the cracking reaction, and without diluting the cracking catalyst.

BRIEF SUMMARY OF THE INVENTION

Accordingly the present invention provides in a process for the catalytic cracking of a nitrogen-containing hydrocarbon feed to lighter products by contacting said feed with a supply of hot, regenerated cracking catalyst in a fluidized catalytic cracking (FCC) reactor means to produce cracked products and spent cracking catalyst containing nitrogen compounds, wherein said spent cracking catalyst is regenerated in a catalyst regeneration means by contact with oxygen or an oxygen-containing gas at catalyst regeneration conditions to produce hot regenerated cracking catalyst and regenerator flue gas containing nitrogen oxides (NO$_x$), the improvement comprising reducing the amount of NO$_x$ in said flue gas by adding to the catalyst regeneration means a catalytically effective amount of a DeNO$_x$ catalyst in an amount sufficient to reduce the NO$_x$ content of said flue gas and in a form whereby at least a majority of said DeNO$_x$ catalyst remains in said regeneration means and does not circulate with the cracking catalyst to the cracking reactor means.

DETAILED DESCRIPTION

The process of the present invention is an integral part of the catalytic cracking process. The essential elements of this process will be briefly reviewed.

The present invention is an improvement for use in any catalytic cracking unit which regenerates cracking catalyst. The invention will be most useful in conjunction with the conventional all riser cracking FCC units, such as disclosed in U.S. Pat. No. 4,421,636, which is incorporated herein by reference.

Although the present invention is applicable to both moving bed and fluidized bed catalytic cracking units, the discussion that follows is directed to FCC units which are considered the state of the art.

FCC FEED

Any conventional FCC feed can be used. The process of the present invention is useful for processing nitrogenous charge stocks, those containing more than 500 ppm total nitrogen compounds, and especially useful in processing stocks containing very high levels of nitrogen compounds, such as those with more than 1000 wt ppm total nitrogen compounds.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids. The present invention is most useful with feeds having an initial boiling point above about 650° F.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5-40 wt % of the catalyst, with the rest being matrix. Conventional zeolites such as X and Y zeolites, or aluminum deficient forms of these zeolites such as dealuminized Y (DEAL Y), ultrastable Y (USY) and ultrahydrophobic Y (UHP Y) may be used. The zeolites may be stabilized with Rare Earths, e.g., 0.1 to 10 wt % RE.

Relatively high silica zeolite containing catalysts are preferred for use in the present invention. They withstand the high temperatures usually associated with complete combustion of CO to $CO_2$ within the FCC regenerator. Catalysts containing 10-40% USY or rare earth USY (REUSY) are especially preferred.

The catalyst inventory may also contain one or more additives, either present as separate additive particles, or mixed in with each particle of the cracking catalyst. Additives can be added to enhance octane (medium pore size zeolites, sometimes referred to as shape selective zeolites, i.e., those having a Constraint Index of 1-12, and typified by ZSM-5, and other materials having a similar crystal structure).

CO combustion additives are available from most FCC catalyst vendors.

The FCC catalyst composition, per se, forms no part of the present invention.

CO COMBUSTION PROMOTER

Use of a CO combustion promoter in the regenerator or combustion zone is not essential for the practice of the present invention, however, it is preferred. These materials are well-known.

U.S. Pat. No. 4,072,600 and U.S. Pat. No. 4,235,754, which are incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit.

SOx ADDITIVES

Additives may be used to adsorb SOx. These are believed to be primarily various forms of alumina, rare-earth oxides, and alkaline earth oxides, containing minor amounts of Pt, on the order of 0.1 to 2 ppm Pt.

Good additives for removal of SOx are available from several catalyst suppliers, such as Davison's "R" or Katalistiks International, Inc.'s "DESOX."

The process of the present invention is believed to work well with these additives, in that the effectiveness of the SOx additive is not impaired by adding our $DeNO_x$ additive.

METALS PASSIVATION

The process of the present invention is not a substitute for conventional metals passivation technology, e.g., the addition of soluble antimony compounds to the feed to reduce the poisoning effects of Ni and V in the feed. When heavy feeds, such as resids or other charge stocks containing a large amount of Ni and/or V are fed to the cracking unit, it may be necessary to add a soluble antimony compound to the feed for metals passivation. Other conventional forms of metals passivation may also be practiced.

FCC REACTOR CONDITIONS

Conventional riser cracking conditions may be used. Typical riser cracking reaction conditions include catalyst/oil ratios of 0.5:1 to 15:1 and preferably 3:1 to 8:1, and a catalyst contact time of 0.1-50 seconds, and preferably 0.5 to 10 seconds, and most preferably about 0.75 to 5 seconds, and riser top temperatures of 900° to about 1050° F.

It is important to have good mixing of feed with catalyst in the base of the riser reactor, using conventional techniques such as adding large amounts of atomizing steam, use of multiple nozzles, use of atomizing nozzles and similar technology.

It is preferred, but not essential, to have a riser catalyst acceleration zone in the base of the riser.

It is preferred, but not essential, to have the riser reactor discharge into a closed cyclone system for rapid and efficient separation of cracked products from spent catalyst. A preferred closed cyclone system is disclosed in U.S. Pat. No. 4,502,947 to Haddad et al, which is incorporated by reference.

It is preferred but not essential, to rapidly strip the catalyst just as it exits the riser, and upstream of the conventional catalyst stripper. Stripper cyclones disclosed in U.S. Pat. No. 4,173,527, Schatz and Heffley, which is incorporated herein by reference, may be used.

It is preferred, but not essential, to use a hot catalyst stripper. Hot strippers heat spent catalyst by adding some hot, regenerated catalyst to spent catalyst. Suitable hot stripper designs are shown in U.S. Pat. No. 3,821,103, Owen et al, which is incorporated herein by reference. If hot stripping is used, a catalyst cooler may be used to cool the heated catalyst before it is sent to the catalyst regenerator. A preferred hot stripper and catalyst cooler is shown in U.S. Pat. No. 4,820,404, Owen, which is incorporated by reference.

The FCC reactor and stripper conditions, per se, can be conventional.

CATALYST REGENERATION

The process and apparatus of the present invention can use conventional FCC regenerators.

Preferably a high efficiency regenerator is used. The essential elements of a high efficiency regenerator include a coke combustor, a dilute phase transport riser and a second dense bed. Preferably, a riser mixer is used. These regenerators are widely known and used.

The process and apparatus can also use conventional, single dense bed regenerators, or other designs, such as multi-stage regenerators, etc. The regenerator, per se, forms no part of the present invention.

NO$_x$ CATALYST COMPOSITION

The process of the present invention can use any catalytic material which will promote the catalytic reduction of NO, NO$_2$, etc. at the conditions experienced in an FCC regenerator. Very great latitude in catalyst composition is possible, because the NO$_x$ removal catalyst is isolated or contained within the FCC regenerator. The catalyst composition, and the chemical reactions to be promoted will be reviewed first, followed by a review of catalyst isolation methods.

In one embodiment, the catalyst is one which promotes some reaction between NO$_x$ and ammonia, so that small amounts of ammonia can be added to the FCC regenerator, and completely consumed therein by reaction with NO$_x$. When NH$_3$ is added to the FCC regenerator, the NO$_x$ reduction catalyst must not oxidize the NH3 to produce additional NO$_x$ under FCC regenerator conditions.

Although the present invention permits ammonia to be effectively used in an FCC regenerator, practice of the invention does not require it, and in many units satisfactory reduction of NO$_x$ emissions can be achieved without ammonia or an ammonia precursor. The amount of reduction in NO$_x$ emissions sought, and the decision to use or avoid ammonia addition, will have an effect on the selection of the NO$_x$ catalyst.

Thus the NO$_x$ reduction catalyst can be any material which has activity for promoting either the reduction of NO$_x$ in conditions experienced in conventional FCC regenerators or any material which promotes reaction of NO$_x$ with ammonia in FCC regenerators. It is believed that any material which is effective for promoting catalytic reduction of NO with CO may also be used in the process of the present invention.

Bismuth and oxides and compounds thereof are effective and preferred as NO$_x$ reduction catalysts. Oxides of lanthanum and yttrium have also shown significant NO$_x$ reduction activity. The Group IVA and VA metals (Ge, Sn, Pb, Sb) all can be used as NO$_x$ reduction catalyst.

Other suitable NO$_x$ reduction catalysts include
1. Metals-containing or metal exchanged zeolites. Any metal exhibiting DeNO$_x$ activity, preferably a transition metal such as Ge, Fe, Ni, Co, Cr, Cu, Bi, Pb, Sb, Zn, Sn, or Mn can be used in any suitable zeolite, such as zeolite beta, zeolite Y, ZSM-35, ZSM-23, MCM-22, zeolite L, VPI-5, pillared clays, and similar materials. Cu-ZSM-5 is a preferred catalyst of this type. Bi-Y or Bi-ZSM-5 is another preferred catalyst of this type.
2. Zeolites modified with rare earths such as Ce and Y group elements.
3. Perovskites, such as ARuO3 and AMnO3, where A is La, Sr, Ba, Na. K. Rb or Pb and mixtures thereof as described in *The Catalytic Chemistry of Nitrogen Oxides*, R. L. Klimsch and J. G. Larson, Ed. Plenum Press, N.Y. 1974, p. 215;
4. Spinels, such as CuCo2O4, as described in *Applied Catalysis*, 34 (1987) 65–76.
5. Metals, or metal compounds, exhibiting DeNO$_x$ activity, used neat or deposited on a non zeolitic support, e.g, bismuth oxide on silica/alumina is preferred. V$_2$O$_5$ on titania, or V$_2$O$_5$ on titania with a modifier such as W$_2$O$_3$ (tungsten oxide), commonly used as a flue gas cleanup catalyst, material may also be used herein.

The zeolite catalysts, and the bismuth catalyst, are most often supported on conventional porous supports, such as alumina, silica-alumina, TiO$_2$, ZrO$_2$, and similar materials.

A simple screening test can be used in a laboratory to determine if a material has the desired NO$_x$ reduction properties, by passing a NO$_x$-containing flue gas through a fixed or fluidized bed of solids containing NO$_x$ catalyst, with or without NH$_3$ addition and analyzing the flue gas for NO$_x$ content.

The NO$_x$ reduction catalyst is maintained in the form of a separate additive particle. Conventional methods of catalyst formation may be used to form a NO$_x$ reduction catalyst of the desired size.

CATALYST ISOLATION

The process of the present invention can be effectively used in any FCC regenerator without regard to possible adverse effects of the DeNO$_x$ catalyst in the FCC reactor, because the NO$_x$ reduction catalyst is used in a form and manner which keeps it out of the FCC reaction zone.

Conventional technology can be used to isolate the DeNO$_x$ catalyst. Regardless of the isolation method chosen, the DeNO$_x$ additive should have a greatly extended residence time in the FCC regenerator, relative to the conventional FCC catalyst. The normal residence time of FCC catalyst in a regenerator can vary greatly depending on specifics of unit design, but in most units the regenerator catalyst residence time will be on the order of 2 to 20 minutes. Preferably the DeNOx catalyst has a residence time in the regenerator equal to at least 1000% of the residence time of the cracking catalyst in the regenerator. If the residence time of the catalyst in the regenerator is 5 minutes, preferably a majority of the DeNOx additive will be retained in the regenerator for longer than 5 minutes. Preferably the DeNO$_x$ addition will have a residence time in the regenerator equal to at least 150% of the residence time of the conventional FCC catalyst, and most preferably will have a residence time at least twice as long.

Segregation can be accomplished by density or by size difference. Methods could involve use of very small NO$_x$ reduction catalyst, or use of relatively large, low density NO$_x$ reduction catalyst.

Disposing the NO$_x$ reduction catalyst on large, hollow spheres, will cause the NO$_x$ reduction catalyst to float to the top of a single, dense bed regenerator and tend to remain there. The particles are large and light and tend to float easily on the fluidized bed. They are not readily swept up into the dilute phase of the process so they tend to stay within the FCC regenerator. A suitable catalyst, e.g., Bi2Ti2O7 or ZnO could be disposed on hollow spheres of alumina or other support material which would float in, and remain in, the regenerator.

An alternative approach, which may require some regenerator modification, is to dispose the NO$_x$ reduction catalyst on relatively small size particles, e.g., 10–40 micron size particles. These smaller size particles can be retained, to a great extent, within the regenerator using the conventional cyclone separators. Because of their small size, they tend to segregate and collect in the upper portions of the FCC regenerator bed. It is possible, by supplying additional stages of cyclone separation, and selectively recycling the fines, from, e.g., the second or third stage cyclone to the upper portion of the catalyst bed in the regenerator, to cause a significant accumulation of $NO_x$ reduction catalyst in the upper portions of the bed.

More details about floaters and fines for catalyst segregation are disclosed in U.S. Pat. No. 4,812,430 and U.S. Pat. No. 4,812,431, which are incorporated herein by reference.

Other approaches can be used, such as providing trays in the FCC regenerator containing relatively large, heavy catalyst particles which remain in the trays. Use of fast settling particles, i.e., those having an average particle diameter in excess of 100 microns, having a settling velocity in excess of typical FCC catalyst, will cause the the $NO_x$ reduction additive to have a greatly extended residence time in many FCC catalyst regenerators. When large, fast settling particles are used, they preferably will range in size from 100 to 1000 microns, with particle size ranges of 100–500, 500–1000, and 300–700 microns having special benefits in specific installations. The optimum particle size will be greatly affected by the geometry of a given FCC regenerator, and on the point of withdrawal of regenerated catalyst, i.e., from an upper or a lower portion of a bed of catalyst.

Catalyst elements can also be physically attached to the regenerator by attaching or stringing hollow catalyst elements or extrudates to wires or rods in the regenerator.

When a 2-stage regenerator, such as a high efficiency regenerator, is used, it will be beneficial to segregate most or all of the $DeNO_x$ catalyst in the second stage of the regenerator, where the water partial pressure is lowest. In this way hydrothermal deactivation of the $NO_x$ removal additive will be minimized. Furthermore, most of the $NO_x$ formed during catalyst regeneration will be produced in the second stage.

AMMONIA SOURCE

Although the present invention does not require the addition of ammonia, it certainly facilitates it and makes it practical. Preferably, the ammonia addition achieves only 10–75% of the reduction of $NO_x$. By this we mean that the $DeNO_x$ catalyst chosen should be capable of reducing $NO_x$ emissions significantly without ammonia addition. Addition of ammonia is preferably used as a trim measure, to reduce less than 50% of the $NO_x$ that normally would be present in the stack gas. By operating in this way, an FCC operator will be assured that all of the ammonia that is added will be consumed, and that little or no ammonia will ever be released up the stack, regardless of swings in the operation of the FCC regenerator. If swings in operation are not a problem, or where local regulation permit, then ammonia can be the major factor in reducing $NO_x$ emissions, or even the sole reducing agent. In this case ammonia can be present in an amount required by stoichiometry to reduce the $NO_x$ in the flue gas, or even in excess.

Ammonia, or an ammonia precursor such as urea or other compound which breaks down in the FCC regenerator, to form ammonia, may be used. Ammonia is inexpensive, easy to add, and is therefore preferred.

EXAMPLES

A series of tests were conducted to determine the effectiveness of various additives for reduction of $NO_x$ emissions at the conditions experienced in FCC regenerators. The tests show that various materials can reduce $NO_x$ emissions, but do not demonstrate segregation of the $NO_x$ conversion catalyst in the regenerator. The $NO_x$ conversion, per se forms no part of the present invention. These tests were run without ammonia addition, but similar results are expected with ammonia addition.

EXAMPLE 1 (Prior Art)

Example 1 is a base case or prior art case operating without any $NO_x$ conversion catalyst.

The catalyst was a sample of spent equilibrium FCC catalyst taken from a commercial FCC unit. Chemical and physical properties are reported in Table 1.

TABLE 1

| SPENT CATALYST PROPERTIES | |
|---|---|
| Surface Area, m²/g | 133 |
| Bulk Density, g/cc | 0.80 |
| Al2O3, wt % | 43.2 |
| Carbon, wt % | 0.782 |
| Nickel, ppm | 1870 |
| Vanadium, ppm | 1000 |
| Sodium, ppm | 3000 |
| Copper, ppm | 28 |
| Iron, ppm | 5700 |
| Platinum, ppm | 1.4 |
| Nitrogen, ppm | 160 |

A 10 g sample of this catalyst was placed in a laboratory fixed fluidized bed regenerator and regenerated at 1300° F. by passing 200 cc/min of a regeneration gas comprising 10% $O_2$ and 90% $N_2$. $NO_x$ emissions in the resulting flue gas were determined via chemiluminescence, using an Antek 703C $NO_x$ detection system.

EXAMPLE 2

Example 1 was repeated, but this time 0.5 g of chemical grade bismuth trioxide (Fisher) was added to the 10 g sample of spent catalyst. The $DeNO_x$ activity was determined by comparing the integrated $NO_x$ signal to the base case without additive. The integrated $NO_x$ signal roughly corresponds to the average performance that would be expected in a commercial FCC unit, operating at steady state conditions. The integrated $NO_x$ was reduced 49%.

EXAMPLES 3,4

Example 1 was repeated with 0.5 g of bismuth zirconate (Ex. 3) and 0.5 g or bismuth titanate (Ex. 4), both from Alfa. The results are reported below in Table 2.

EXAMPLES 5,6 (Ti, Zr)

Example 1 was repeated with 0.5 g of titanium oxide (Aldrich) and again with 0.5 g of a zirconium oxide. There was little or no $DeNO_x$ activity, the peak $NO_x$ emissions were if anything increased slightly by these additives. The results are reported below in Table 2.

TABLE 2

| EXAMPLE | ADDITIVE | % REDUCTION IN $NO_x$ |
|---|---|---|
| 1 (base) | none | base |
| 2 | Bi2O3 | 49 |
| 3 | Bi4Zr3O12 | 38 |
| 4 | Bi2Ti2O7 | 53 |
| 5 | TiO2 | 1 |
| 6 | ZrO2 | (3) |

The process of the present invention also allows some unusual additives to be used, such as those that would not last as long as desired if allowed to circulate freely through an FCC unit. Zinc metal, and probably several other metals, exerts a significant vapor pressure at FCC reactor conditions. There is concern that the reducing atmosphere in the reactor might lead to reduction of zinc oxides to zinc metal, which could be lost with the cracked hydrocarbons, or could be deposited on surfaces within the reactor. Zinc oxide has a much lower vapor pressure, and the use of zinc in FCC units would be more predictable if the oxide form could be maintained. That zinc is a desirable catalyst is shown by the following experiments.

EXAMPLE 7

Example 1 was repeated with 0.5 g of chemical grade zinc oxide (ZnO) obtained from Fisher. The integrated $NO_x$ was reduced 41%.

EXAMPLE 8

Example 1 was repeated with 0.5 g of zinc phosphate (Zn3(PO4)2) obtained from Pfaltz & Bauer. The integrated $NO_x$ was reduced 25%.

EXAMPLE 9

Example 1 was repeated with 0.5 g of ZnZrO3 obtained from Pfaltz & Bauer. The integrated $NO_x$ was reduced 2%. This may not be significant, as it is probably within the limits of experimental error of the test.

EXAMPLE 10

Example 1 was repeated with 0.5 g of ZnTiO3 obtained from Pfaltz & Bauer. The integrated $NO_x$ was reduced 7%.

EXAMPLE 11

Example 1 was repeated with 0.5 g of bound Cu-ZSM-5. This catalyst was prepared by aqueous ion exchange (copper acetate) of a silica-alumina bound ZSM-5 having a $SiO_2/Al_2O_3$ ratio of 26/1. The bound ZSM-5, suitable for direct use in FCC applications, consisted of 75% binder and 25% ZSM-5, by weight. After calcining and drying, elemental analysis showed 4% Cu. The integrated $NO_x$ was reduced by 89%.

The experimental results are summarized in Table 3.

TABLE 3

| EXAMPLE | ADDITIVE | % REDUCTION IN $NO_x$ |
|---|---|---|
| 1 (base) | none | base |
| 7 | ZnO | 41 |
| 8 | Zn3(PO4)2 | 25 |
| 9 | ZnZrO3 | 2 |
| 10 | ZnTiO3 | 7 |
| 11 | Cu-ZSM-5 | 89 |

The above examples show that there are catalysts which are capable of reducing $NO_x$ emissions from FCC regenerators.

The bismuth oxides, ZnO, and Cu-ZSM-5 are preferred catalysts for use herein. Bismuth does not seem to display much activity in the FCC reactor section, so if some of the bismuth oxide finds its way into the reactor there will be little or no adverse consequences. Bismuth oxides could be considered a "fail-safe" additive, in that if the catalyst support fails the additive will do no harm in the reactor. Another fail-safe approach is to put the DeNO$_x$ catalyst on a support which will be blown out of the reactor if it fails, or to use an abrading or attriting support with a relatively high attrition index, so that within 10 days or 5 days a majority of the additive will be removed with catalyst fines.

The process of the present invention allows a catalyst to be picked primarily based on its ability to reduce $NO_x$ emissions from FCC regenerators. Powerful catalysts, in relatively high concentrations, can be used without concern that the cracking catalyst will be diluted by the DeNO$_x$ catalyst, and without concern re. possible adverse reactions in the cracking reactor caused by the DeNO$_x$ catalyst.

The process of the invention allows catalyst which can tolerate oxidizing atmospheres, but not reducing atmospheres, to be used. Isolating the catalyst in the regenerator assures that the catalyst will not be exposed to the FCC reactor, any feed metals that deposit on catalyst in the base of the riser reactor, or to any $H_2S$. Isolating the catalyst from the FCC reactor thus prevents damage to the $NO_x$ catalyst from the FCC process, in addition to avoiding undesirable reactions in the FCC reactor due to the presence of the $NO_x$ catalyst.

The process of the present invention can be readily used in many existing FCC regenerators with little or only minor modifications to the unit, such as providing a bottom draw for regenerated catalyst, or adding extra stages of cyclone separation, with diplegs selectively discharging DeNO$_x$ catalyst disposed on small particles to a dilute phase region of the regenerator.

We claim:

1. In a process for the catalytic cracking of a nitrogen-containing hydrocarbon feed to lighter products by contacting said feed with a supply of hot, regenerated cracking catalyst in a fluidized catalytic cracking (FCC) reactor means to produce cracked products and spent cracking catalyst containing nitrogen compounds, wherein said spent cracking catalyst is regenerated in a catalyst regeneration means by contact with oxygen or an oxygen-containing gas at catalyst regeneration conditions to produce hot regenerated cracking catalyst and regenerator flue gas containing nitrogen oxides ($NO_x$), the improvement comprising reducing the amount of $NO_x$ in said flue gas by adding to the catalyst regeneration means a catalytically effective amount of a DeNO$_x$ catalyst in an amount sufficient to reduce the $NO_x$ content of said flue gas and in a form whereby said DeNO$_x$ catalyst has an extended residence time in said regenerator relative to said cracking catalyst.

2. The process of claim 1 wherein the DeNO$_x$ catalyst is selected from the group of Group IVA and Group VA elements and compounds thereof.

3. The process of claim 1 wherein the DeNO$_x$ catalyst comprises about 100 ppm to 80 wt %, on an elemental metal basis, of a metal or metal oxide of Ge, Fe, Ni, Co, Cr, Cu, Bi, Pb, Sb, Zn, Sn, Mn or mixtures thereof.

4. The process of claim 1 wherein the DeNO$_x$ catalyst is selected from the group of metal exchanged zeolites, zeolites modified with rare earths, perovskites and spinels.

5. The process of claim 1 wherein the DeNO$_x$ catalyst comprises Cu-ZSM-5.

6. The process of claim 1 wherein the DeNO$_x$ catalyst comprises bismuth and oxides of bismuth.

7. The process of claim 1 wherein the FCC regenerator comprises at least one dense phase fluidized bed of catalyst, the FCC catalyst has a conventional particle size, particle volume and particle density suitable for use in an FCC unit, and wherein the DeNO$_x$ catalyst is present as a solid particle with a specific volume at least 10 times greater than the volume of the conventional FCC catalyst and having a low density, relative to the dense bed density, so that the $DeNO_x$ catalyst floats to the top of the regenerator dense bed.

8. The process of claim 1 wherein the FCC regenerator comprises at least one dense phase fluidized bed of catalyst, catalyst, and catalyst fines and flue gas are removed from said dense phase fluidized bed as a dilute phase, which is passed through at least one cyclone separation means which recovers more than 90% of the catalyst entering the cyclone and the cyclone discharges the recovered catalyst to the dense bed, the FCC catalyst has a conventional particle size, particle volume and particle density suitable for use in an FCC unit, and wherein the $DeNO_x$ catalyst is present as a solid particle with a particle size and/or density such that the $DeNO_x$ catalyst segregates within said dense phase fluidized bed near an upper portion thereof, and wherein a catalyst withdrawal means is located in a lower portion of said dense bed whereby a stream of regenerated catalyst is removed from said dense bed which is deficient in $DeNO_x$ catalyst relative to the concentration of said $DeNO_x$ catalyst in said upper portion of said regenerator dense bed.

9. The process of claim 1 wherein the $DeNO_x$ catalyst is physically attached to the regeneration means.

10. The process of claim 1 wherein the $DeNO_x$ catalyst is deposited on a support having an average equivalent particle diameter of 100 to 1000 microns.

11. The process of claim 1 wherein the $DeNO_x$ catalyst is deposited on a support having an average equivalent particle diameter of 100 to 500 microns.

12. The process of claim 1 wherein the $DeNO_x$ catalyst is deposited on a support having an average equivalent particle diameter of 500 to 1000 microns.

13. The process of claim 1 wherein the $DeNO_x$ catalyst is deposited on a support having an average equivalent particle diameter of 300 to 700 microns.

14. The process of claim 1 wherein the $DeNO_x$ catalyst has a residence time in said regeneration means equal to at least 200% of the residence time of said cracking catalyst in said regeneration means.

15. The process of claim 1 wherein the $DeNO_x$ catalyst has a residence time in said regeneration means equal to at least 1000% of the residence time of said cracking catalyst in said regeneration means.

* * * * *